June 8, 1965 — A. M. LEITZEL — 3,187,691
MOLDED PALLET
Filed May 20, 1963

INVENTOR
AMMON M. LEITZEL
BY BUCKHORN, BLORE,
KLARQUIST & SPARKMAN
ATTORNEYS 3,187,691
MOLDED PALLET
Ammon M. Leitzel, Portland, Oreg., assignor to Pacific Pulp Molding Co., Portland, Oreg., a corporation of Washington
Filed May 20, 1963, Ser. No. 281,711
6 Claims. (Cl. 108—58)

The subject matter of the present invention relates generally to pallet members for supporting loads of material thereon so that such loads can be moved easily by a lift truck or other suitable device, and can also be supported on and easily moved on conveyors and the like including devices having live rolls or gravity rolls, and in particular the invention relates to molded pallets having fork receiving channels and stiffening ribs formed integrally therewith to provide a pallet of simple and inexpensive construction.

The pallets of the present invention are especially useful to transport sacks or boxes of load material by the means of a lift truck whose forks are inserted into the channels of the pallet. The pallet may be molded in one piece from wood pulp or other suitable material to provide a strong, lightweight and inexpensive pallet member which is free from splinters and safe to handle. Another advantage of the present pallet member is that the stiffening ribs formed integrally therewith are diagonally arranged in a chevron pattern so that they resist bending in both directions corresponding to the two pairs of fork receiving channels. Also the stiffening ribs provide a lower surface enabling loaded pallets to be carried on various conveying devices including those made up of a series of rolls. In addition, the molded pallets of the present invention can be stored by stacking them on top of each other in a nested manner to save storage space, and to prevent the stacked pallets from sliding relative to one another so that they do not fall. The stiffening ribs of the pallet perform the additional function of spacing the upper surface of the fork receiving channels a sufficient distance from the ground to allow the insertion of forks into one pair of channels. When the pallets are molded of wood pulp they are extremely inexpensive so that they may be thrown away or otherwise disposed of. Thus the pallets may be shipped with the load materials supported thereon without the removal of such pallets which results in saving of the time required to unload the pallets before shipping and to reload the material on other pallets at the point of destination.

It is therefore one object of the present invention to provide an improved pallet member for supporting load material thereon.

Another object of the invention is to provide an improved pallet which is strong, lightweight and inexpensive to produce.

A further object of the invention is to provide an improved pallet which is molded in one piece to provide a splinter free construction for safe handling and is of such a configuration that it can be stacked with other pallets in a nested manner to save storage space.

Still another object of the present invention is to provide an improved molded pallet for a lift truck in which two pairs of fork receiving channels and a plurality of stiffening ribs are formed integral with such pallet so that such ribs extend diagonally across the pallet in a chevron pattern to increase the bending strength of such pallet in both directions corresponding to such two pairs of channels.

A further object of the invention is to provide an improved molded pallet having stiffening ribs and which has a lower bottom structure enabling loaded pallets to be easily moved by or over conveyor devices of various types including those having a series of rolls.

A still further object of the invention is to provide an improved molded pallet of wood pulp which is simple and inexpensive so that it may be shipped with the load material supported thereon or otherwise disposed of.

Additional objects and advantages of the present invention will be apparent from the following detailed description of a preferred embodiment thereof of which:

Figure 1:
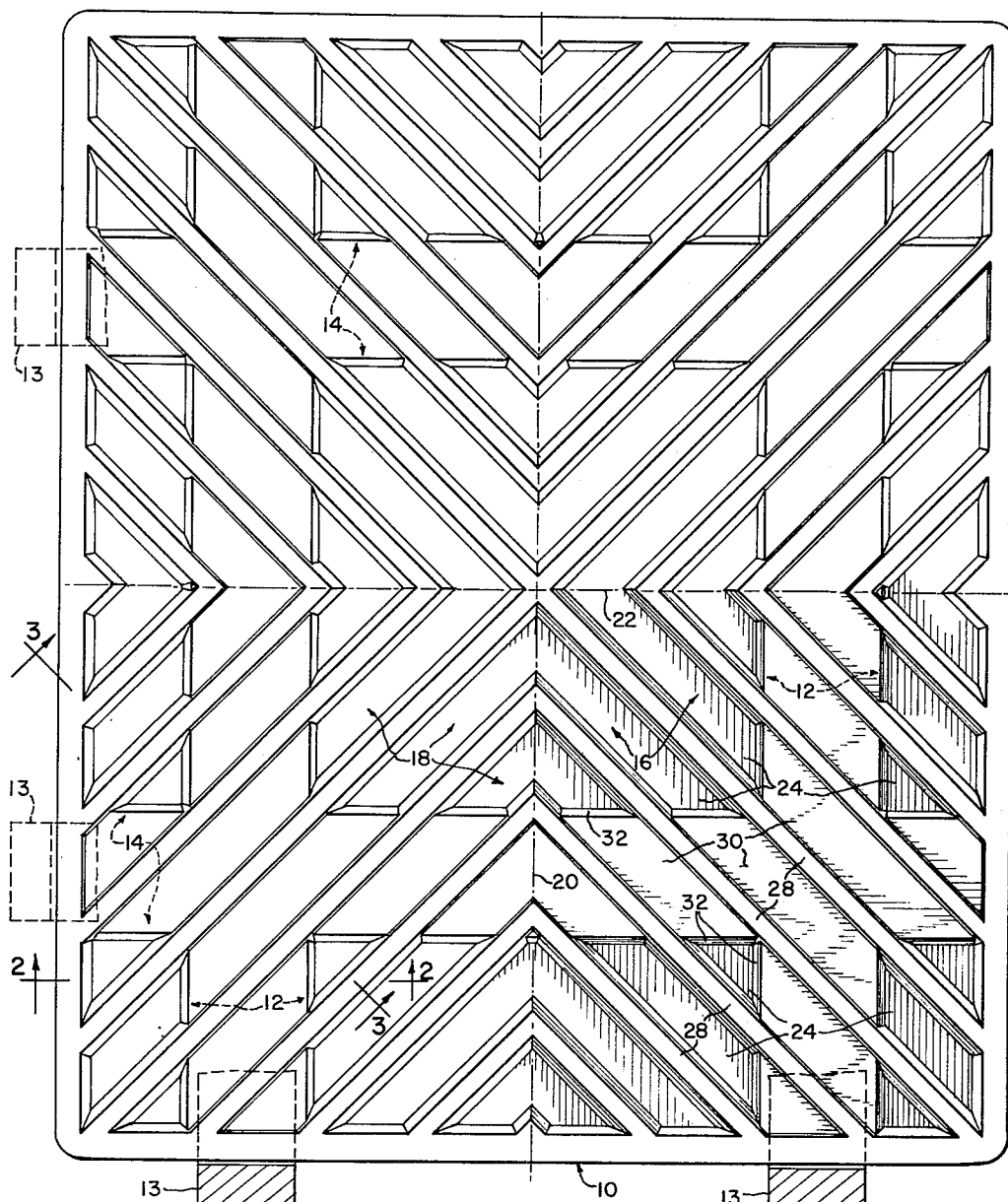
FIG. 1 is a plan view of the upper side of one embodiment of the molded pallet of the present invention.
Figure 3:
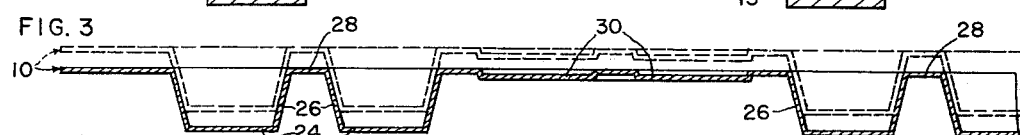
FIG. 3 is a sectional view taken along the lines 3—3 of FIG. 1.
Figure 2:
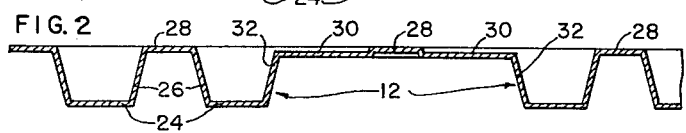
FIG. 2 is a section taken along the line 2—2 of FIG. 1.

As shown in FIGS. 1 to 3, a rectangular pallet member 10 in accordance with the present invention is molded in one piece. Such pallet may be of any convenient size, for example, 40 x 48 x 1¾ inches. It may be made of wood pulp, plastic or other suitable material and may have a web thickness of the order of ⅛ inch. The pallet member 10 is provided with a pair of integral, longitudinal, fork receiving channels 12 which extend lengthwise of the pallet member substantially parallel to the longest side thereof. The longitudinal channels 12 are formed with a minimum width which is greater than the width of the lift truck forks 13 to be inserted into such channels, and are spaced apart by a distance corresponding to the distance between such forks. For example, the width of the channels may be 4 15/16 inches and be spaced 24 inches on centers. The longitudinal channels extend completely across the pallet member 10 in order to enable the forks 13 to be inserted into the channels from either end thereof. A pair of transverse fork receiving channels 14 are also formed integral with the pallet member 10 so that such transverse channels extend across the pallet substantially parallel to the shorter side of such pallet and intersect the longitudinal channels 12 at substantially right angles. The transverse channels 14 are of approximately the same width as the longitudinal channels 12 and are also spaced apart substantially the same distance so that the forks 13 of the lift truck may be inserted into such transverse channels from either end thereof. It is apparent that the pallet member 10 may be engaged by the lifting forks inserted in its channels from any of four positions corresponding to each side of the pallet member. Thus, the pallet member 10 may be subjected to bending forces in either of two directions, i.e., either substantially parallel to the longitudinal channels 12 or to the transverse channels 14 when lifting forks are inserted into one pair or the other of such channels.

A plurality of stiffening ribs 16 and 18 are formed integral with the pallet member to resist the bending forces exerted on the pallet member. These stiffening ribs may be formed so that they extend in diagonal directions across the underside of the pallet member. One set of ribs 16 all extend in one direction parallel to a diagonal of the pallet member 10, while the other set of ribs 18 extend in a direction substantially parallel to the other diagonal of the pallet member. The ribs 16 and 18 intersect each other at an angle along the longitudinal axis 20 of the pallet member and also along the transverse axis 22 of such pallet member to form a chevron pattern consisting of four symmetrical pallet portions which are joined at such axes.

Each of the stiffening ribs is formed by a bottom portion 24 on the lower side of the pallet member, and a pair of side portions 26 which slant inwardly toward the bottom portion. The ridges are separated by top portions 28 on the upper side of the pallet member which extend between the side portions of the intersecting ridges forming the individual chevron stripes of the chevron pattern to space such stripes from each other. As an example the bottom portion 24 may be 1.69 inches wide and the top portion 28 may be ¾ inch wide. The outer surfaces of the top portions 28 are substantially coplanar and form the upper side of the pallet member 10. Thus, top portions 28 function as the bearing surface for the load supported on the pallet member. It should be noted that the side portions 26 of the stiffening ribs shown extend at an angle of about 105° with respect to the bottom portion 24 and the top portion 28. Also, this sloping rib configuration provides the ribs with added strength to resist crushing due to the load applied to the upper side of the pallet.

The stiffening ribs 16 and 18 run across the channels 12 and 14 so they are each provided with an intermediate portion 30 of reduced height. This intermediate portion 30 replaces the bottom portion 24 of the ribs in the channels in order to enable the insertion of lifting forks into the channels. The intermediate portions 30 are joined to the bottom portions 24 by transition regions 32 which slope downward from the ends of the intermediate portion to one end of the bottom portions. Thus the transition regions 32 form the sides of the channels 12 and 14. From the above, it can be seen that the molded pallet member 10 is formed with three levels, including the bottom portions 24, the intermediate portions 30 and the top portions 28. The stiffening ribs 16 and 18 extend across the fork receiving channels 12 and 14 for additional support, but are of reduced height to provide such channels. Also, the upper surfaces of the channels 12 and 14 are spaced from the bottom portions 24 of the stiffening ribs which are in contact with the ground by a distance, for example 1½ inches, providing adequate clearance for insertion of the lifting forks into the channels. As has been mentioned previously, the molded pallet members 10 may be stacked on top of each other in a nested manner, as shown by the dotted lines in FIG. 3, to conserve storage space. It is apparent that the pallet may be square and that such configuration is included within the term "rectangular."

For additional strength, a resin or other suitable type of plastic may be added to the wood pulp slurry used to form the molded pallet and precipitated on the fibers prior to forming the pallet. The pallet member may be formed by conventional vacuum molding techniques which include the steps of immersing a suction die in the pulp slurry, removing the water from the pulp by suction, compressing such pulp and heating the molded pallet to dry the pulp on the die before removing such pallet from such die. The curing of the resin, when a thermosetting resin is employed, may be accomplished in such heating step or a subsequent heating step may be employed for this purpose. Alternately the pallet may be impregnated with a liquid resin or a resin solution after forming and drying. If a thermosetting resin is employed, it may be subsequently cured in a heating step.

The load to be supported on the pallet member 10 may be in the form of sacks or boxes of material which are fastened to the upper side of the pulp member by metal straps extending through the channels 12 and 14 to distribute the load evenly over the entire surface of the pallet member. The pallet member may remain attached to the load of material when such material is shipped to a customer and may be disposed of by such customer.

It will be obvious to those having ordinary skill in the art that various changes may be made in the details of the above described embodiment of the present invention without departing from the spirit of the invention. Therefore, the scope of the invention should be determined by the following claims.

I claim:

1. A pallet for supporting a load of material thereon, comprising:

a molded pallet member of wood pulp having a pair of substantially parallel channels formed integral with said pallet member on one side thereof;

said pallet member having a plurality of stiffening ribs formed integral therewith to extend diagonally across said pallet member; and said ribs having flat top and bottom portions on the opposite sides of said pallet member which are substantially coplanar to enable the load to be distributed on said top portions, and to enable the pallet member to rest on said bottom portions.

2. A pallet for supporting a load of material thereon, comprising:

a molded pallet member of wood pulp having channels formed integral with said pallet member on one side thereof;

said pallet member having a plurality of stiffening ridges formed integral therewith to extend diagonally across said pallet member; and at least some of said ridges having top and bottom portions on the opposite sides of said pallet member which enable the load to be carried on said top portions and enable the pallet member to rest on said bottom portions, and at least some of said ridges having portions of reduced height extending across said channels in order to allow the insertion of lifting members into said channels.

3. A pallet for supporting a load of material thereon, comprising:

a rectangular pallet member having a first pair of substantially parallel channels and a second pair of substantially parallel channels formed integral with said pallet member on one side thereof, said second pair of channels intersecting said first pair of channels at substantially right angles;

said pallet member having a plurality of stiffening ribs formed integral therewith to extend diagonally across said pallet member and intersecting in a chevron pattern, said ribs having portions of reduced height extending across said channels in order to allow the insertion of lifting members into said channels.

4. A pallet for supporting a load of material thereon, comprising:

a rectangular pallet member of molded material having a first pair of substantially parallel fork receiving channels and a second pair of substantially parallel fork receiving channels formed integral with said pallet member on one side thereof, said second pair of channels intersecting said first pair of channels at substantially right angles;

said pallet member having a plurality of stiffening ribs formed integral therewith to extend diagonally across said pallet member and intersecting pattern to provide support against bending when said pallet member is lifted by either said first pair or said second pair of channels; and said ribs having top and bottom portions on the opposite sides of said pallet member which enable the load to be carried on said top portions and enable the pallet member to rest on said bottom portions, and said ribs having portions of reduced height extending across said channels in order to allow the insertion of the forks of a lift truck into said channels.

5. A pallet for supporting a load of material thereon, comprising:

a rectangular pallet member of molded wood pulp having a first pair of substantially parallel fork receiving channels and a second pair of substantially parallel fork receiving channels formed integral with said pallet member on one side thereof, said second pair of channels intersecting said first pair of channels at substantially right angles;

said pallet member having a plurality of stiffening ridges formed integral therewith to extend diagonally across said one side of said pallet member and intersecting to form a chevron pattern, said ridges being provided with inwardly sloping sides to enable a plurality of the pallet members to be nested on each other, and having portions of reduced height extending across said channels in order to allow the insertion of the forks of a lift truck into said channels.

6. A pallet for supporting a load of material thereon, comprising:

a rectangular pallet member of molded wood pulp having a first pair of substantially parallel fork receiving channels and a second pair of substantially parallel fork receiving channels formed integral with said pallet member on one side thereof, said second pair of channels intersecting said first pair of channels at substantially right angles;

said pallet member having a plurality of stiffening ribs formed integral therewith to extend in both diagonal directions across said one side of said pallet member and intersecting in a chevron pattern, said ribs having portions of reduced height extending across said channels and having portions of greater height to space the upper surface of said channels from the support on which the pallet member is lying in order to allow the insertion of the forks of a lift truck into said channels.

References Cited by the Examiner

UNITED STATES PATENTS

| | | | |
|---|---|---|---|
| 2,372,055 | 3/45 | Braun | 108—58 |
| 2,463,214 | 3/49 | Stoner | 108—58 X |
| 2,544,743 | 3/51 | Vrabcak | 108—52 |
| 2,903,218 | 9/59 | Altenburg | 108—53 |
| 2,951,669 | 9/60 | Davidson | 108—56 |
| 3,006,590 | 10/61 | Hoag | 108—56 |
| 3,092,046 | 6/63 | Davidson | 108—56 |

FOREIGN PATENTS

| | | |
|---|---|---|
| 539,747 | 7/54 | Belgium. |
| 838,477 | 7/60 | Great Britain. |

FRANK B. SHERRY, *Primary Examiner.*